United States Patent
Ondetti et al.

[11] 3,892,726
[45] July 1, 1975

[54] TYROSINE-O-SULFATE CONTAINING PEPTIDES

[75] Inventors: Miguel Angel Ondetti, Princeton; Josip Pluscec, Ewing Township; John T. Sheehan, Middlesex, all of N.J.

[73] Assignee: E. R. Squibb & Sons, Inc., Princeton, N.J.

[22] Filed: Dec. 4, 1972

[21] Appl. No.: 312,150

Related U.S. Application Data

[63] Continuation-in-part of Ser. No. 828,368, May 27, 1969, abandoned.

[52] U.S. Cl.............................. 260/112.5; 424/177
[51] Int. Cl. ................... C07c 103/52; A61k 37/00
[58] Field of Search................................. 260/112.5

[56] References Cited
UNITED STATES PATENTS

| | | | |
|---|---|---|---|
| 3,579,494 | 5/1971 | Ondetti et al..................... | 260/112.5 |
| 3,705,140 | 12/1972 | Bernardi et al.................. | 260/112.5 |
| 3,723,406 | 3/1973 | Ondetti et al..................... | 260/112.5 |

FOREIGN PATENTS OR APPLICATIONS

| 1,800,129 | 5/1969 | Germany ......................... | 260/112.5 |
|---|---|---|---|

OTHER PUBLICATIONS

Jorpes, Gastroenterology, 55, 157–64 (1968).
Anastasi et al., "Peptides 1968," Bricas, ed., North–Holland Pub. Co., Amsterdam, 1968, pp. 247–250.
Anastasi et al., Experientia, 24, 771–773, (1968).
Morley, "Peptides," Beyerman et al., eds., North Holland Publishing Co., Amsterdam, 1967, pp. 226–234.
Morley et al., Nature, 207, 1356–1359, (1965).

*Primary Examiner*—Elbert L. Roberts
*Assistant Examiner*—Reginald J. Suyat
*Attorney, Agent, or Firm*—Lawrence S. Levinson; Merle J. Smith; Burton Rodney

[57] ABSTRACT

Disclosed herein are novel peptides having utility as diagnostics for diseases of the gallbladder or pancreas. The novel peptides of this invention possess a common O-sulfate-tyrosine moiety and have been found to be more active than the natural hormone cholecystokinin-pancreozymin. The compounds of the invention have the formula Z—Y—X—Gly—W—V—U—T and pharmaceutically acceptable ammonium salts, alkali metal salts or alkaline earth metal salts thereof wherein Z may be R—Asp, wherein R is hydrogen or an acyl group derived from a carboxylic acid of from 2 to about 16 carbons, an alkyl carbonic acid, or a dicarboxylic acid; or Z may be Ala, α-aminobutyryl or β-Asp;

Y may be

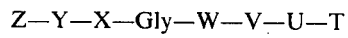

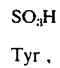

X may be Met, Leu, Nle, α-aminobutyryl,
W may be Trp or D-Trp;
V may be Met, Leu, Nle or α-aminobutyryl;
U may be Asp, Ala, or Glu;
T may be Phe-NH$_2$ or D-Phe-NH$_2$;

provided that all optically active amino acids are of the L-configuration unless otherwise indicated.

10 Claims, No Drawings

TYROSINE-O-SULFATE CONTAINING PEPTIDES

RELATED APPLICATION

This application is a continuation-in-part of our co-pending application, Ser. No. 828,368 filed May 27 1969, now abandoned.

This invention relates to novel peptides possessing an O-sulfate-tyrosine moiety. It has been found that these peptides are substantially more active than cholecystokinin-pancreozymin, and are less affected by enzymatic degradation than cholecystokinin-pancreozymin.

It has been discovered that novel combinations of amino acids have the activity and utility referred to above when each possesses the common moiety O-sulfate-tyrosine. The novel compounds of this invention and the salts thereof are useful as diagnostic aids in examination of the gallbladder contraction and pancreatic secretion. They are administered in a manner similar to cholecystokinin-pancreozymin. However, the amount of novel compound of each dosage unit may vary from about $1 \times 10^{-5}$ to about $1 \times 10^{-7}$ mg./kg. of body weight.

Peptide salts encompassed by the novel compounds or peptides of this invention include, for example, pharmaceutically acceptable ammonium salts, such as ammonium, dicyclohexylammonium, triethylammonium, morpholinium, pyridinium and the like. Other salts of metal cations can also be prepared such as alkali metal salts, e.g., sodium or potassium, and alkaline earth metal salts, e.g., magnesium or calcium.

It has been discovered, as mentioned above, that novel combinations of amino acids yield the products of this invention which possess the desired utility. Among these combinations, one which is considered the most potent of these peptides is a peptide having the formula:

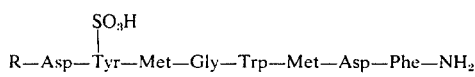

wherein R is an acyl group derived from a carboxylic acid of about 2 to about 16 carbons, an alkyl carbonic acid, or a dicarboxylic acid.

Examples of carboxylic or alkyl carbonic acids which may be utilized in the practice of this invention are acetic, propionic, valeric, caproic, lauric, palmitic, tertiary butyloxycarbonic or benzyloxycarbonic, fumaric, maleic or succinic acid.

Although the above peptide is the preferred combination of amino acids that yields the desired activity, it has been further found that the combination of amino acids having the formula:

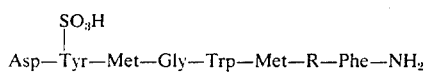

wherein $R^1$ is alanyl or glutamyl also gives extremely beneficial results.

Other combinations of amino acids which give cholecystokinin-pancreozymin activity of the order set forth above are:

(a) 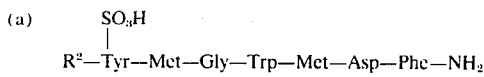

wherein $R^2$ is an alanyl, α-aminobutyryl, β-aspartyl, maleyl or fumaryl, (b) 

wherein $R^3$ is a leucyl, norleucyl or α-aminobutyryl (c) 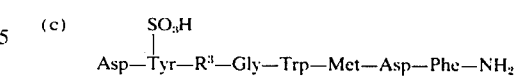

wherein $R^3$ is as described above.

(d) 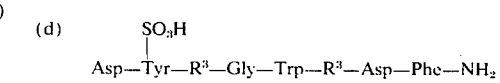

wherein $R^3$ is as defined above.

(e) 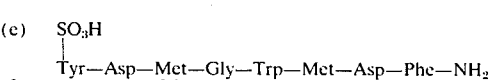
(f) 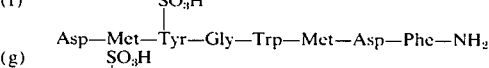
(g) 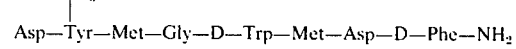

The novel peptides of this invention and the novel intermediates thereof may be prepared by methods well known to the art, for example, they may be prepared by combining individual amino acids on a step-by-step basis, or alternatively, by combining groups of amino acids to yield the desired end product. Such additions as is known are accomplished by protecting the amino group of the amino acid or group of amino acids by converting it to, for example, its benzyloxycarbonyl derivative, and then activating the carboxylic group of such amino acid or group of amino acids by converting it, for example, to its nitrophenyl-ester derivative. Such a protected-activated intermediate is then allowed to react with another amino acid or group of amino acids with a free group, thus extending the peptide chain.

Among the suitable activating groups may be mentioned any combination of group which causes the acid function of the amino acid to become more reactive, such as mixed anhydrides (which normally involves the acylation of an amine with the mixed anhydrides of, for instance, an acyl amino acid and isovaleric acid), azides, acid chlorides, reaction products with carbodiimides, reactive N-acyl compounds, O-acyl hydroxylamine derivatives and active esters, such as alkyl esters with electron withdrawing (negative) substituents, vinyl esters, enol esters, phenyl esters, thiophenyl esters, nitrophenyl esters, 2,4-dinitrophenyl esters, trichlorophenyl esters, and nitrophenylthiol esters. The use of nitrophenyl esters is particularly preferred from the standpoint of yield, lack of by-products, and consequent ease of purification.

In forming peptide sequences of this invention, the amino functions may be protected by commonly used amino protecting groups such as benzyloxycarbonyl, nitrobenzyloxycarbonyl, methoxybenzyloxycarbonyl, tertiary butyloxycarbonyl, phthalyl, o-nitrophenylsulfenyl, tosyl, and so forth. Methyl, ethyl, tertiary butyl, benzyl, nitrobenzyl, trimethylbenzyl, etc. may be used to protect the carbonyl groups. The hydroxyl protecting groups may be benzyl, tertiary butyl, tetrahydropyranyl, and so forth. For a more detailed discussion of protecting groups and a more thorough listing thereof, reference may be had to standard works on peptide synthesis, e.g., Bodanszky et al., Peptide Synthesis, Interscience, 1966, chapter IV.

The protecting groups are removed by known reactions such as reduction with sodium in liquid ammonia, hydrogenolysis (for instance, in the presence of a palladium on charcoal catalyst), treatment with a hydrohalo acid (such as hydrobromic or hydrochloric acids) in acetic acid or treatment with trifluoroacetic acid.

To prepare the free amines after treatment with a hydrohalo acid in acetic acid, the hydrobromide salt is exposed either to an ion exchange resin such as Amberlite IR400 or neutralized with a base such as triethylamine.

The invention may further be illustrated by the following examples:

EXAMPLE 1 t-Butyloxycarbonyl-L-alanyl-L-phenylalanine amide

Palladium on charcoal (10% 1.8 g.) was added to a solution of benzyloxycarbonyl-L-phenylalanine amide (37.1 g.) in acetic acid (80%, 390 ml.), and the suspension was stirred under a hydrogen atmosphere for 22 hours. The catalyst was filtered, and the filtrate concentrated in vacuo. Ethyl acetate (100 ml.) was added to the oily residue and the L-phenylalanine amide acetate precipitated.

L-phenylalanine amide acetate (4.48 g.) in dimethyl formamide (30 ml.) was made alkaline by the addition of triethylamine (2.8 ml.). To this solution was added t-butyloxycarbonyl-L-alanine-p-nitrophenyl ester (6.9 g.) and allowed to react at room temperature for 6 hours. t-Butyloxycarbonyl-L-alanine-p-nitrophenyl ester (0.31 g.) was again added and after standing a total of 22 hours at room temperature the mixture became ninhydrin negative.

The reaction mixture was diluted with ethyl acetate 200 ml. and washed with citric acid (20%, 1 × 100 ml.), and water (4 × 100 ml.). The organic layer was dried (MgSO$_4$), and the solvent remained in vacuo. The residue was crystallized from ethyl acetate. wt. = 3.5 g.

EXAMPLE 2 t-Butyloxycarbonyl-L-methionine-L-alanyl-L-phenylalanine amide

The protected dipeptide (10.3 g.) was dissolved in trifluoroacetic acid (45 ml.). After about 15 minutes at room temperature most of the trifluoroacetic acid was removed in vacuo and the residue was triturated with ether (1 l.). The free amine-trifluoroacetate was filtered, washed with ether, and dried in vacuo over sodium hydroxide. Wt. = 10.4 g.

To a solution of the trifluoroacetate (10.05 g.) in dimethylformamide (90 ml.), triethylamine (4.2 ml.) was added and the solution cooled in an ice bath. t-Butyloxycarbonyl-L-methionine trichlorophenyl ester (15.9 g.) was added and the solution was allowed to come to room temperature. After standing overnight at room temperature another portion of t-Butyloxycarbonyl-L-methionine trichlorophenyl ester was added (1.45 g.) and 3 hours later the reaction mixture was ninhydrin negative. Total reaction time approximately 19 hours. Acetic acid (4.2 ml.) was added and the mixture was evaporated to an oily residue. Ethyl acetate (200 ml.) was added and the product precipitated in the form of a gel. It was warmed on a steam bath and the protected tripeptide crystallized upon cooling.

It was recrystallized from hot absolute alcohol (300 ml.).

EXAMPLE 3 t-Butyloxycarbonyl-L-tryptophyl-L-methionyl-L-alanyl-L-phenylalanine amide

The protected tripeptide (10.8 g.) was dissolved in trifluoroacetic acid (50 ml.). After about 15 minutes at room temperature most of the trifluoroacetic acid was removed in vacuo and the residue was triturated with ether (1 l.). The free amine-trifluoroacetate was filtered, washed with ether, and dried in vacuo over sodium hydroxide. Wt. = 11.8 g.

To a solution of the trifluoroacetate (11.8 g.) in dimethylformamide (75 ml.), triethylamine (3.4 ml.) was added and the solution cooled in an ice bath. t-Butyloxycarbonyl-L-tryptophan trichlorophenyl ester (13.1 g.) was added and the solution was allowed to come to room temperature. After standing for 6 hours, another portion of t-Butyloxycarbonyl-L-tryptophan trichlorophenyl ester (0.595 g.) was added and the reaction mixture was allowed to stand overnight at room temperature. After a total of 22 hours, acetic acid (3.4 ml.) was added and the reaction mixture was evaporated to an oily residue. Ethyl acetate (200 ml.) was added followed by the addition of ether (75 ml.) and the precipitate changed from gel-like to crystalline. It was collected by filtration, washed with ether and air dried. Recrystallization was accomplished by dissolving in hot absolute ethanol (100 ml.) filtering while hot and slowly cooling to room temperature. The crystals were collected by filtration and air dried.

EXAMPLE 4 t-Butyloxycarbonylglycyl-L-tryptophyl-L-methionyl-L-alanyl-L-phenylalanine amide The protected tetrapeptide (7.5 g.) was dissolved in trifluoroacetic acid (30 ml.) under a nitrogen atmosphere. After about 15 minutes at room temperature most of the trifluoroacetic acid was removed in vacuo and the residue was triturated with ether (1 l.). The free amine-trifluoroacetate was filtered, washed with ether, and dried in vacuo over sodium hydroxide. Wt. = 7.98 g.

To a solution of the trifluoroacetate (7.98 g.) in dimethylformamide (40 ml.), triethylamine (1.8 ml.) was added and the solution cooled in an ice bath. t-Butyloxycarbonyl-glycine nitrophenyl ester (4.72 g.) was added and the solution was allowed to come to room temperature and stand overnight. It was evaporated to an oily residue and the pentapeptide was precipitated with ethylacetate (150 ml.). The product was collected by filtration and air dried. It was crystallized from boiling methanol and collected by filtration. Wt. = 5.2 g.

EXAMPLE 5 t-Butyloxycarbonyl-L-methionylglycyl-L-tryptophyl-L-methionyl-L-alanyl-L-phenylalanine amide The protected pentapeptide (5.2 g.) was dissolved in trifluoroacetic acid (21 ml.) under a nitrogen atmosphere. After about 15 minutes at room temperature, it was diluted with ether (800 ml.) and the precipitate was collected by filtration and dried in vacuo. Wt. = 5.3 g.

To a solution of the trifluoroacetate, (5.3 g.) in dimethylformamide (21.6 ml.), triethylamine (1.02 ml.) was added and the solution cooled in an ice bath. t-Butyloxycarbonyl-L-methionine trichlorophenyl ester (3.69 g.) was added and the solution was allowed to come to room temperature. After 4 hours the reaction mixture was neutral and more triethylamine (0.05 ml.) was added followed by another portion of t-butyloxycarbonyl-L-methionine trichlorophenyl ester (0.165 g.). It was allowed to stand overnight at room temperature and more ester was added (0.165 g.), the following morning. Three hours later (total reaction time 23 hours) the reaction mixture was concentrated in vacuo and the residue was triturated with ethyl acetate (100 ml.). The product had the consistency of a paste and was collected by centrifugation. Ethyl alcohol (95%, 50 ml.) was used for crystallization and the hexapeptide was collected by filtration and dried in vacuo over sodium hydroxide. Wt. = 4.5 g.

EXAMPLE 6 t-Butyloxycarbonyl-L-aspartyl-L-tyrosyl-L-methionylglycyl-L-tryptophyl-L-methionyl-L-alanyl-L-phenylalanine amide The protected hexapeptide (1.0 g.) was dissolved in trifluoroacetic acid (10 ml.) under a nitrogen atmosphere. After about 15 minutes at room temperature the reaction was diluted with ether (200 ml.). The trifluoroacetate that precipitated was collected by filtration and dried in vacuo. Wt. = 964 mg.

t-Butyloxycarbonyl-L-aspartyl-L-tyrosine hydrazide (410 mg.) was dissolved in dimethylformamide (4 ml.) ar room temperature then cooled to −20°C. in a dry ice-acetone bath. After 5 minutes hydrochloric acid (0.48 ml.) was added and the temperature was raised to −15° C. for 3 minutes. Sodium nitrite (0.5 ml. of 14% sol.) was added and after 5 minutes the temperature was lowered to −25° C. for the addition of N-ethyl piperidine (1.04 ml.).

The hexapeptide trifluoroacetate (685 mg.) was dissolved in dimethylformamide (3.5 ml.) and added to the chilled azide solution. The reaction was allowed to proceed overnight at −50° C. The next morning half the amount of the previous azide solution was prepared and added to the reaction mixture. After proceeding approximately 34 hours the reaction mixture was added dropwise to acetic acid (0.2 M., 150 ml.) while the solution was mechanically stirred. The product precipitated and was collected by centrifugation and dried in vacuo over sodium hydroxide. Wt. = 790 mg.

EXAMPLE 7

L-Aspartyl-O-sulfate-L-tyrosyl-L-methionylglycyl-L-tryptophyl-L-methionyl-L-alanyl-L-phenylalanine amide The protected octapeptide was dissolved in dimethylformamide (21 ml., anhydrous), followed by the addition of pyridine (21 ml.). Sulfur trioxide pyridine complex (954 mg.) was dissolved in dimethylformamide (21 ml., anhydrous) and added to the peptide solution. The reaction mixture was allowed to stand 18 hours at room temperature, then concentrated to an oily residue in vacuo. The protected octapeptide sulfate precipitated upon the addition of water (15 ml.) to the residue. It was collected by filtration, washed with water, and dried in vacuo. Wt. = 344 mg.

The protected octapeptide sulfate was dissolved in trifluoroacetic acid (6 ml.) under a nitrogen atmosphere and allowed to stand at room temperature for 15 minutes. The reaction mixture was diluted with ether (25 ml.) and the octapeptide sulfate that precipitated was collected by centrifugation and dried in vacuo. Wt. = 339 mg.

EXAMPLE 8 t-Butyloxycarbonyl-L-leucyl-L-aspartyl-L-phenylalanine amide

N-Benzyloxycarbonyl-(β-benzyl)-L-aspartyl-L-phenylalanine amide (30 g.) was dissolved in acetic acid (95%, 700 ml.) by warming slightly on a steam bath. Palladium on charcoal (5%, 6.0 g.) was added and the suspension was stirred under a hydrogen atmosphere for three hours when another portion of palladium on charcoal (5%, 3.0 g.) was added. After 19 hours of hydrogenolysis more palladium on charcoal (5%, 2.0 g.) was added and after a total of 25 hours the catalyst was filtered and the filtrate concentrated in vacuo to approximately 100 ml. and freeze dried. The residue was dissolved in water (6.0 ml.) and warmed on the steam bath. Acetone (400 ml.) was added while still warm and the product precipitated. It was refrigerated for 2 hours then collected by filtration, washed with acetone and dried in vacuo over sodium hydroxide. Wt. = 16.5 g.

A suspension was made of L-aspartyl-L-phenylalanine amide (14.0 g.) in dimethylformamide (175 ml.) and cooled in an ice bath. Triethylamine (7.2 ml.) was added followed by the addition of t-butyloxycarbonyl-L-leucine nitrophenyl ester (18.0 g.). After 40 minutes of mechanically stirring the cold suspension a homogeneous solution was effected. It was allowed to stir under refrigeration (50°C.) for 16 hours. The solution was then added to a vigorously stirred mixture of water (750 ml.) and cyclohexane (250 ml.) containing acetic acid (3 ml.). The tripeptide separated as a thixotropic compound that was thoroughly chilled then collected by filtration on a sintered glass funnel and washed with water (100 ml.). It was suspended in absolute ethanol (250 ml.) and heated on a steam bath for 15 minutes at 50°C. It was chilled for 2 hours then collected by filtration, washed with ether and dried in vacuo. Wt. = 18.0 g.

EXAMPLE 9 t-Butyloxycarbonyl-L-tryptophyl-L-leucyl-L-aspartyl-L-phenylalanine amide

Trifluoroacetic acid (72 ml.) was cooled in a dry-ice-acetone bath and added to t-butyloxycarbonyl-L-leucyl-L-aspartyl-L-phenylalanine amide (18 g.). It was allowed to stand at room temperature for 30 minutes after which it was diluted, while cooled in an ice bath with ether (700 ml.). The free amine-trifluoroacetate was filtered, washed with ether and dried in vacuo. Wt. = (18.2 g.).

The trifluoroacetate (18.2 g.) was dissolved in dimethylformamide (250 ml.) and chilled in an ice bath. Triethylamine (10.2 ml.) was added followed by the addition of t-butyloxycarbonyl-L-tryptophan (20.0 g.). The mixture was raised to room temperature and after 7 hours another portion of t-butyloxycarbonyl-L-tryptophan (0.87 g.). It was allowed to stand at room temperature overnight then it was slowly poured into a mechanically stirred water-ice (1.5 l.) solution containing acetic acid (8 ml.). The protected tetrapeptide was filtered, washed with water (200 ml.) and air dried. The dried product was boiled with absolute alcohol (400 ml.), cooled to room temperature, chilled, then filtered, washed with absolute alcohol (100 ml.) and dried in vacuo. Wt. = 21.4 g.

EXAMPLE 10 t-Butyloxycarbonylglycyl-L-tryptophyl-L-leucyl-L-aspartyl-L-phenylalanine amide t-Butyloxycarbonyl-L-tryptophyl-L-leucyl-L-aspartyl-L-phenylalanine amide (500 mg.) was dissolved in trifluoroacetic acid (5 ml.) and allowed to sit at room temperature for 20 minutes. The reaction mixture was diluted with ether (100 ml.) and the precipitate collected by filtration and dried in vacuo. Wt. = 503 mg.

The free amine-trifluoroacetate (503 mg.) was dissolved in dimethylformamide (8 ml.) and chilled in an ice bath. Triethylamine (0.25 ml.) was added followed by the addition of t-butyloxycarbonylglycine-p-nitrophenyl ester (295 mg.) and the mixture was raised to room temperature. After 4 ½ hours another portion of the active ester was added (25 mg.) and the mixture was allowed to react overnight. It was then slowly poured into a water-ice (50 ml.) solution containing acetic acid (0.5 ml.). The precipitate was collected by filtration, dried, then crystallized from boiling ethyl alcohol (50 ml.) Wt. = 300 mg.

EXAMPLE 11 t-Butyloxycarbonyl-L-leucylglycyl-tryptophyl-L-leucyl-L-aspartyl-L-phenylalanine amide t-Butyloxycarbonylglycyl-L-tryptophyl-L-leucyl-L-aspartyl-L-phenylalanine amide (1.87 g.) was dissolved in trifluoroacetic acid (15 ml.) and allowed to stand at room temperature for 20 minutes. The reaction mixture was diluted with ether (1 l.), the precipitate collected by filtration and dried in vacuo. Wt. = 1.75 g.

The free amine trifluoroacetate (1.75 g.) was dissolved in dimethylformamide (30 ml.) and chilled in an ice bath. Triethylamine (0.34 ml.) was added, followed by the addition of t-butyloxycarbonyl-L-leucine-p-nitrophenyl ester (1.02 mg.) and the reaction mixture was raised to room temperature. After 16 hours the reaction mixture was poured into ethyl acetate (600 ml.) and refrigerated for 3 hours. The product was collected by centrifugation, washed with ether, and dried in vacuo. Wt. = 980 mg.

EXAMPLE 12 t-Butyloxycarbonyl-L-aspartyl-L-tyrosyl-L-leucylglycyl-L-tryptophyl-L-leucyl-L-aspartyl-L-phenylalanine amide t-Butyloxycarbonyl-L-leucylglycyl-L-tryptophyl-L-leucyl-L-aspartyl-L-phenylalanine amide (1.3 g.) was dissolved in trifluoroacetic acid (15 ml.) and allowed to stand at room temperature for 15 minutes. The reaction mixture was diluted with ether (1 l.), the precipitate collected by filtration and dried in vacuo. Wt. = 1.2 g.

t-Butyloxycarbonyl-L-aspartyl-L-tyrosine hydroazide (270 mg.) was dissolved in dimethylformamide (2.6 ml.) and cooled to −15°C. for 5 minutes. Hydrochloric acid (conc. 0.31 ml.) was added and the temperature was kept at −15°C for 5 minutes. Sodium nitrite (14%, 0.325 ml.) was added and after 5 minutes the temperature was lowered to −20°C. N-ethylpiperidine (0.675 ml.) was added. Followed by the addition of the free amine trifluoroacetate (0.620 g.) in dimethylformamide (2.6 ml.). The reaction was allowed to proceed under refrigeration temperature for 24 hours while being mechanically stirred. One-half the amount of the azide solution was prepared and added to the reaction mixture and after an additional 12 hours, one-fourth the original amount was added. The reaction time was 51 hours. The mixture was poured into a water-ice solution (35 ml.) containing acetic acid (3%). The protected octapeptide precipitated and was collected by filtration. It was crystallized from ethyl alcohol-water (15 ml. + 5 ml.) filtered and dried in vacuo. Wt. = 366 mg.

EXAMPLE 13

N-Benzyloxycarbonyl-(γ-benzyl)-L-glutamyl-L-phenylalanine amide

L-Phenylalanine amide acetate (38.3 g.) was dissolved in dimethylformamide (170 ml.) and made alkaline with triethylamine (23 ml.). The solution was chilled in an ice water bath (10°C.) and γ-benzyl-N-carbobenzoxy-L-glutamic acid p-nitrophenyl ester (98.0 g.) in dimethylformamide (91 ml.) was added in portions over a 20 minute time interval. The reaction was allowed to proceed under refrigeration for 24 hours, then poured into a mixture of water (800 ,l.) and cyclohexane (345 ml.). The precipitate that formed was collected by filtration. It was crystallized from hot ethyl alcohol (100 ml.) and ethyl acetate (100 ml.). Wt. = 71 g.

EXAMPLE 14 t-Butyloxycarbonyl-L-methionyl-L-glutamyl-L-phenylalanine amide

N-benzyloxycarbonyl-(γ-benzyl)-L-glutamyl-L-phenylalanine amide (30 g.) was dissolved in acetic acid (95%, 700 ml.) by warming slightly on a steam bath. Palladium on charcoal (5%, 6.0 g.) was added and the suspension was stirred under a hydrogen atmosphere for 3 hours when another portion of palladium on charcoal (5%, 2.0 g.) was added and after a total of 25 hours the catalyst was filtered and the filtrate concentrated in vacuo to approximately 100 ml. and freeze dried. The residue was dissolved in water (60 ml.) and warmed on the steam bath. Acetone (400 ml.) was added while still warm and the product precipitated. It was refrigerated for 2 hours then collected by filtration, washed with acetone and dried in vacuo over sodium hydroxide. Wt. = 16.5 g. L-glutamyl-L-phenylalanine amine.

A suspension of L-glutamyl-L-phenylalanine amide (14.3 g.) in dimethylformamide (175 ml.) was chilled in an ice bath. Triethylamine (7.2 ml.) was added, followed by the addition of t-butyloxycarbonyl-L-methionine trichlorophenyl ester (21.8 g.). After 21 hours another portion of the ester was added (1.1 g.) and after 25 hours more of the ester was added (3.1 g.). After a total reaction time of 41 hours the mixture was slowly poured into a vigorously stirred water (750 ml.) cyclohexane (250 ml.) solution containing acetic acid (3 ml.). The protected tripeptide suspension was cooled and after 3 hours the product was collected by filtration, washed with ether and air dried. It was crystallized from boiling ethyl alcohol (95%, 775 ml.). Collected by filtration and air dried. Wt. = 17.3 g.

EXAMPLE 15 t-Butyloxycarbonyl-L-tryptophyl-L-methionyl-L-glutamyl-L-phenylalanine amide t-Butyloxycarbonyl-L-methionyl-L-glutamyl-L-phenylalanine amide (34.0 g.) was dissolved in chilled trifluoroacetic acid (136 ml.). The temperature was raised and the solution allowed to sit at room temperature for 30 minutes. It was diluted with ether (1360 ml.) and the precipitate collected by filtration, washed with ether and dried in vacuo. Wt. = 35.6 g.

The free amine trifluoroacetate (35.3 g.) was dissolved in dimethylformamide (470 ml.) and chilled in an ice bath. Triethylamine was added (18.5 ml.) followed by the addition of t-butyloxycarbonyl-L-tryptophyl trichlorophenyl ester (35.4 g.). The reaction mixture was brought to room temperature and 4 hours later another portion of active ester was added (3.2 g.) After 23 hours the reaction mixture was poured into ice-water (3 l.) containing acetic (13.5 ml.). The gelatinous precipitate was collected by filtration and air dried. It was crystallized by boiling with ethyl alcohol (95%, 670 ml.) and cooling to room temperature. After refrigerating for 3 hours, it was collected by filtration and dried in vacuo. Wt. = 57.0 g.

EXAMPLE 16 t-Butyloxycarbonylglycyl-L-tryptophyl-L-methionyl-L-glutamyl-L-phenylalanine amide t-Butyloxycarbonyl-L-tryptophyl-L-methionyl-L-glutamyl-L-phenylalanine amide (33 g.) was dissolved in chilled trifluoroacetic acid (149 ml.) under a nitrogen atmosphere. The temperature was raised and the solution was allowed to sit at room temperature for 25 minutes. It was diluted with ether (2150 ml.), collected by filtration and dried in vacuo. Wt. = 35.4 g.

The free amine trifluoroacetate (35.1 g.) was dissolved in dimethylformamide (400 ml.) and chilled in an ice bath. Triethylamine (12.4 ml.) was added followed by the addition of t-butyloxycarbonylglycyl-p-nitrophenyl ester (15.4 g.). The reaction was run in the cold room and after 6 hours, more of the active ester (0.7 g.) was added. After 74 hours the reaction mixture was poured into a mechanically stirred solution of ice-water ( 2 l.) containing acetic acid (14.8 ml.). It was collected by filtration and dried in vacuo. Wt. = 33.3 g.

EXAMPLE 17 t-Butyloxycarbonyl-L-methionylglycyl-L-tryptophyl-L-methionyl-L-glutamyl-L-phenylalanine amide t-Butyloxycarbonylglycyl-L-tryptophyl-L-methionyl-L-glutamyl-L-phenylalanine amide (22.8 g.) was dissolved in trifluoroacetic acid (100 ml.). After 20 minutes standing at room temperature the solution was diluted with ether (1.8 l.). The free-amine trifluoroacetate was collected by filtration and dried in vacuo. Wt. = 23.1 g.

The free-amine trifluoroacetate (23.1 g.) was dissolved in dimethylformamide (265 ml.) and chilled in an ice bath. Triethylamine was added (8.4 ml.) followed by the addition of t-butyloxycarbonyl-L-methionine trichlorophenyl ester (14.8 g.) and the solution brought to room temperature. After 6 hours, more of the active ester was added (0.74 g.), and after 19 hours the reaction mixture was poured into a vigorously stirred solution of ethyl acetate (1.8 l.) containing acetic acid (12 ml.). The precipitate was collected by centrifugation and washed with ether. It was then filtered and dried in vacuo. Wt. = 19 g., crystallized from ethyl alcohol (95%, 270 ml.), collected by filtration and dried in vacuo. Wt. = 15 g.

EXAMPLE 18 t-Butyloxycarbonyl-L-alanyl-L-tyrosine hydrazide t-Butyloxycarbonyl-L-tyrosine-N-benzyloxycarbonyl hydrazide (13.6 g.) was dissolved in trifluoroacetic acid and allowed to sit at room temperature under a nitrogen atmosphere for 15 minutes. It was concentrated in vacuo and the residue triturated with ether (200 ml.). The trifluoroacetate was collected by filtration. Wt. = 4.0 g.

L-tyrosine-N-benzyloxycarbonylhydrazide trifluoroacetate (4.0 g.) was dissolved in dimethylformamide (32 ml.) and chilled to 0°C. Triethylamine (1.2 ml.) was added, followed by the addition of t-butyloxycarbonyl-L-alanine-p-nitrophenyl ester (4.0 g.). The reaction was allowed to proceed at room temperature for 6 hours then more t-butyloxycarbonyl-L-alanine-p-nitrophenyl ester (620 mg.) was added. After 22 hours the reaction mixture was diluted with ethyl acetate (200 ml.), and washed with citric acid (1 × 50 ml., 20%) and water (3 × 50 ml.). It was dried over magnesium sulfate and concentrated in vacuo to an oily residue. The residue was treated with isopropyl ether (100 ml.) and after several days a precipitate formed. It was collected by filtration and air dried. Crystallization was effected from a combination of isopropyl alcohol-isopropyl ether and collected by filtration. Wt = 1.5 g.

t-Butyloxycarbonyl-L-alanyl-L-tyrosine-N-benzyloxycarbonylhydrazide (370 mg.) was dissolved in a mixture of methanol : 2, acetic acid : 1, water : 1 (20 ml.). Palladium on charcoal (5%, 150 mg.) was added and hydrogen was passed into the system until no more carbon dioxide was liberated from the reaction flask. The catalyst was removed by filtration and the filtrate concentrated in vacuo. It was crystallized from ethyl alcohol-water, and isopropyl alcohol-isopropyl ether. Wt. = 150 mg.

EXAMPLE 19 t-Butyloxycarbonyl-L-alanyl-L-tyrosyl-L-methionyl glycyl-L-tryptophyl-L-methionyl-L-aspartyl-L-phenylalanine amide t-Butyloxycarbonyl-L-alanyl-L-tyrosine hydrazide (136 mg.) was dissolved in dimethylformamide (1.5 ml.) and cooled to −20° C. in a dry ice-acetone bath. After five minutes hydrochloric acid (0.173 ml.) was added and the temperature was raised to −15° C. for 3 minutes. Sodium nitrite (0.18 ml. of a 14% solution) was added and after five minutes the temperature was lowered to −25° C. for the addition of N-ethylpiperidine (0.375 ml.).

The hexapeptide, L-methionylglycyl-L-tryptophyl-L-methionyl-L-aspartyl-L-phenylalanine amide trifluoroacetate (302 mg.), was dissolved in dimethylformamide (0.8 ml.) and added to the chilled azide solution. The reaction was allowed to proceed at refrigeration temperature. After two days the reaction mixture was poured into acetic acid (35 ml., 3%, 0° C.) and the product precipitated. It was collected by filtration and air dried. Crystallization was effected with ethyl alcohol (95%, 10 ml.) and collected by filtration, dried in vacuo wt = 229 mg.

EXAMPLE 20 t-Butyloxycarbonyl-L-α-aminobutyryl-L-tyrosine hydrazide

L-Tyrosine-N-benzyloxycarbanylhydrazide (4.0 g.) was dissolved in dimethylformamide (32 ml.) and chilled to 0° C. Triethylamine (1.5 ml.) was added, followed by the addition of t-butyloxycarbonyl-L-α-amino butyric acid trichlorophenyl ester (3.8 g.). The reaction mixture was allowed to stand at room temperature for 16 hours, then it was diluted with ethyl acetate (200 ml.) and washed with citric acid (1 × 50 ml., 20%) and water (3 × 50 ml.). It was dried over sodium sulfate and concentrated in vacuo to an oily residue, which became crystalline after treatment with isopropyl ether.

It was distributed in a methanol: 4, toluene: 2.5, chloroform: 2.5, water: 1, system for 250 transfers. The fraction K=1.9 was concentrated in vacuo and the residue triturated with isopropyl ether. wt=150 mg.

EXAMPLE 21 t-Butyloxycarbanyl-L-α-aminobutyryl-L-tyrosyl-L-methionylglycyl-L-tryptophyl-L-methionyl-L-aspartyl-L-phenylalanine amide t-Butyloxycarbanyl-L-α-aminobutyryl-L-tyrosine hydrazide (147 mg.) was dissolved in dimethylformamide (1.6 ml.) and cooled to −15° C. in a dry-ice acetone bath for 3 minutes. Hydrochloric acid (0.186 ml.) was added and after three minutes at −15° C. sodium nitrite (0.194 ml., 14% solution) was added, and the temperature kept at −15° C. for 3 minutes. The temperature was lowered to −20° C. and N-ethyl piperidine (0.39 ml.) was added.

The hexapeptide, L-methianylglycyl-L-tryptophyl-L-methianyl-L-aspartyl-L-phenylalanine amide trifluoroacetate (325 mg.) was dissolved in dimethylformamide (0.5 ml.) and added to the chilled azide solution. The reaction was allowed to proceed at refrigeration temperature for 2 days. It was poured into acetic acid (40 ml., 3%, 0° C.) and the crude product that precipitated was collected by filtration. It was crystallized from ethyl alcohol (95%, 10 ml.), collected by filtration and dried in vacuo wt = 181 mg.

EXAMPLE 22

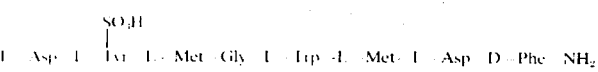

The title compound is prepared following the procedure of Ondetti et al., Pharmacology of Hormonal Polypeptides and Proteins, Back et al., ed., Plenum Press, New York (1968), pp. 27–29, but substituting D-Phe for L-Phe. The resulting protected octapeptide Nα-Boc-OBu'-L-Asp-L-Tyr-L-Met-Gly-L-Trp-L-Met-L-Asp-D-Phe-NH$_2$ is treated with trifluoroacetic acid for one hour to remove the tert-butyl and Boc protecting groups, and then sulfated by adding with vigorous stirring the free octapeptide (300 mg) in portions to 18 ml of concentrated H$_2$SO$_4$ containing 408 mg of KHSO$_4$ cooled to −20°C. After 15 minutes the solution is poured into cold ether (400 ml) and the precipitate filtered, washed with cold ether, suspended in water and brought into solution by addition of NH$_4$OH. The octapeptide sulfate is then isolated by ion-exchange chromatography in (NH$_4$)$_2$CO$_3$.

EXAMPLE 23

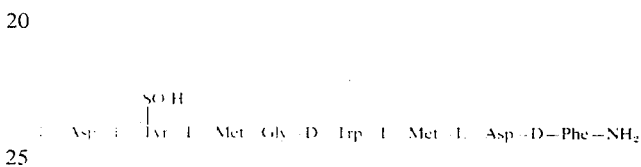

The title compound is obtained following the procedure of Example 22 but substituting D-Trp for L-Trp.

EXAMPLE 24

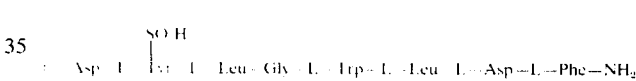

The title compound is prepared by treating the protected octapeptide of Example 12 according to the procedure of Example 7.

EXAMPLE 25

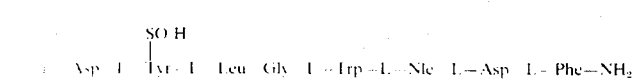

The title compound is prepared following the procedure of Examples 8 – 12 and 24 but substituting L-Nle for L-Leu in the procedure of Example 8.

EXAMPLE 26

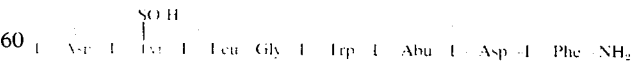

The title compound is prepared following the procedure of Examples 8–12 and 24 but substituting L-Abu for L-Leu in the procedure of Example 8.

EXAMPLE 27

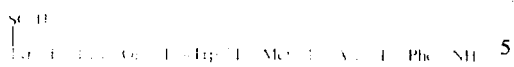

The title compound is prepared following the procedure of Examples 8–12 and 24 but substituting L-Met for L-Leu in the procedure of Example 8.

EXAMPLE 28

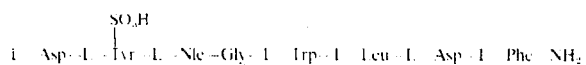

The title compound is prepared following the procedure of Examples 8–12 and 24 but substituting L-Nle for L-Leu in the procedure of Example 11.

EXAMPLE 29

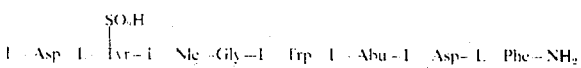

The title compound is prepared following the procedure of Examples 8–12 and 24 but substituting L-Abu for L-Leu in the procedure of Example 8, and substituting L-Nle for L-Leu in the procedure of Example 11.

EXAMPLE 30

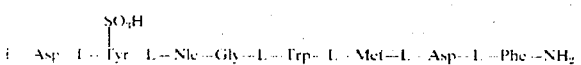

The title compound is prepared following the procedure of Examples 8–12 and 24 but substituting L-Met for L-Leu in the procedure of Example 8, and substituting L-Nle for L-Leu in the procedure of Example 11.

EXAMPLE 31

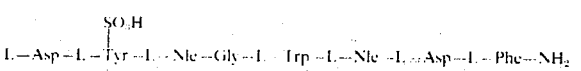

The title compound is prepared following the procedure of Examples 8–12 and 24 but substituting L-Nle for L-Leu in the procedure of Example 8, and substituting L-Nle for L-Leu in the procedure of Example 11.

EXAMPLE 32

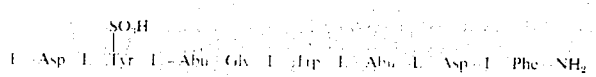

The title compound is prepared following the procedure of Examples 8–12 and 24 but substituting L-Abu for L-Leu in the procedure of Example 8, and substituting L-Abu for L-Leu in the procedure of Example 11.

EXAMPLE 33

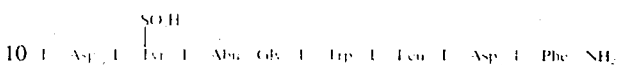

The title compound is prepared following the procedure of Examples 8–12 and 24 but substituting L-Abu for L-Leu in the procedure of Example 11.

EXAMPLE 34

The title compound is prepared following the procedure of Examples 8–12 and 24 but substituting L-Nle for L-Leu in the procedure of Example 8, and substituting L-Abu for L-Leu in the procedure of Example 11.

EXAMPLE 35

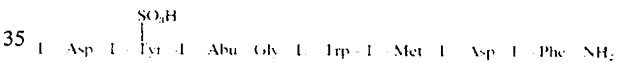

The title compound is prepared following the procedure of Examples 8–12 and 24 but substituting L-Met for L-Leu in the procedure of Example 8, and substituting L-Abu for L-Leu in the procedure of Example 11.

EXAMPLE 36

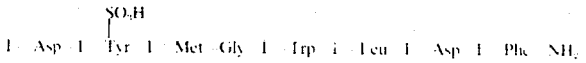

The title compound is prepared following the procedure of Examples 8–12 and 24 but substituting L-Met for L-Leu in the procedure of Example 11.

EXAMPLE 37

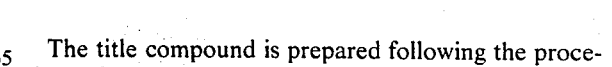

The title compound is prepared following the procedure of Examples 8–12 and 24 but substituting L-Nle for L-Leu in the procedure of Example 8, and substituting L-Met for L-Leu in the procedure of Example 11.

EXAMPLE 38

The title compound is prepared following the procedure of Examples 8–12 and 24 but substituting L-Abu for L-Leu in the procedure of Example 8, and substituting L-Met for L-Leu in the procedure of Example 11.

EXAMPLE 39

The title compound is obtained by treating the N-protected octapeptide of Example 19 according to the procedure of Example 7.

EXAMPLE 40

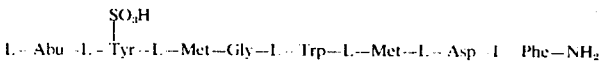
L-Abu-L-Tyr-L-Met-Gly-L-Trp-L-Met-L-Asp-L-Phe-NH₂

The title compound is obtained by treating the N-protected octapeptide of Example 21 according to the procedure of Example 7.

EXAMPLE 41

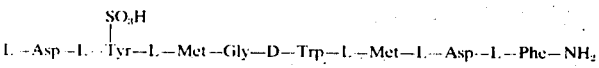
L-Asp-L-Tyr-L-Met-Gly-D-Trp-L-Met-L-Asp-L-Phe-NH₂

The title compound is prepared following the procedure of Ondetti et al., Pharmacology of Hormonal Polypeptides and Proteins, Back et al., ed., Plenum Press, New York (1968), pp. 27–29, but substituting D-Trp for L-Trp. The resulting protected octapeptide N$^\alpha$-Boc-OBu$^t$-L-Asp-L-Tyr-L-Met-Gly-D-Trp-L-Met-L-Asp-L-Phe-NH₂ is treated as described in Example 22.

EXAMPLE 42

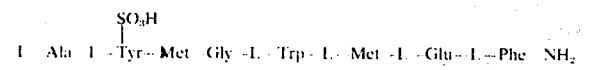
L-Ala-L-Tyr-Met-Gly-L-Trp-L-Met-L-Glu-L-Phe-NH₂

The title compound is prepared by coupling the protected dipeptide hydrazide of Example 18 to the free hexapeptide trifluoroacetate of Example 17 according to the procedure of Example 6. The resulting protected octapeptide is then sulfated following the procedure of Example 7.

EXAMPLE 43

The compound of Example 27 (1 g) is dissolved in DMF (10 ml) and triethylamine (0.28 ml). Hexanoic acid p-nitrophenyl ester (0.84 g) is added and the mixture is stored at room temperature overnight. The product is isolated by precipitation with ethyl acetate (containing 3% acetic acid). Yield 1.1 g.

EXAMPLE 44

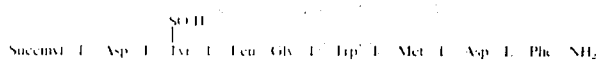
Succinyl-L-Asp-L-Tyr-L-Leu-Gly-L-Trp-L-Met-L-Asp-L-Phe-NH₂

The compound of Example 27 (1 g) is dissolved in DMF (10 ml) and triethylamine (0.28 ml). Succinic anhydride (0.3 g) is added and the mixture is stored at room temperature overnight. The product is isolated by precipitation with ethyl acetate (containing 3% acetic acid). Yield 1 g.

EXAMPLE 45

A. N$^\alpha$-t-Butyloxycarbonyl-β-L-Asp-L-Tyr-hydrazide

The title compound is obtained following the procedure of Example 18 but substituting αOBzl-L-Asp for L-Ala, and O-Bzl-Tyr for Tyr.

B. t-Butyloxycarbonyl-β-L-Asp-L-Tyr-L-Met-Gly-L-Trp-L-Met-L-Asp-L-Phe-NH₂

The title compound is prepared by coupling the protected dipeptide hydrazide from A to the free hexapeptide trifluoroacetate as per Example 19.

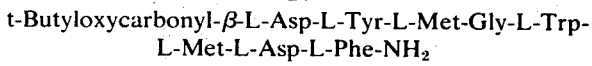

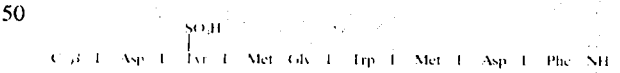

The title compound is prepared by the procedure described in Example 7, but utilizing the compound of B as starting material.

What is claimed is:

1. A compound having the formula

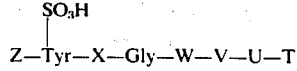
Z—Tyr—X—Gly—W—V—U—T wherein
Z is Ala, Abu, or β-Asp or R-Asp wherein R is hydrogen, alkanoyl of from 2 to 16 carbon atoms, t- butyloxycarbonyl, benzyloxycarbonyl, fumaryl, maleyl, or succinyl;

X is Met, Leu, Nle or Abu,
W is Trp or D-Trp;
V is Met, Leu, Nle or Abu;
U is Asp, Ala or Glu;
T is Phe-NH$_2$ or D-Phe-NH$_2$;

and pharmaceutically acceptable ammonium, alkali metal or alkaline earth metal salts thereof provided that only one of X and V is Met when the other is Leu, Nle, or Abu, that all optically active amino acid residues are of the L-configuration unless otherwise indicated, and that R is not H when the compound has the formula

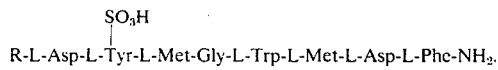
R-L-Asp-L-Tyr-L-Met-Gly-L-Trp-L-Met-L-Asp-L-Phe-NH$_2$.

2. A compound according to claim 1 having the formula

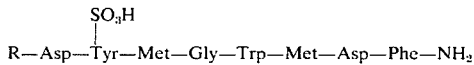
R—Asp—Tyr—Met—Gly—Trp—Met—Asp—Phe—NH$_2$ wherein all optically active amino acid residues are of the L-configuration and wherein R is alkanoyl of from 2 to 16 carbon atoms, t-butyloxycarbonyl, benzyloxycarbonyl, fumaryl, maleyl or succinyl, and pharmaceutically acceptable ammonium, alkali metal or alkaline earth metal salts thereof.

3. A compound according to claim 1 having the formula:

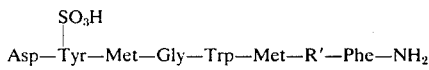
Asp—Tyr—Met—Gly—Trp—Met—R′—Phe—NH$_2$ wherein all optically active amino acid residues are of the L-configuration and wherein R′ is Ala or Glu, and pharmaceutically acceptable ammonium, alkali metal or alkaline earth metal salts thereof.

4. A compound according to claim 1 having the formula:

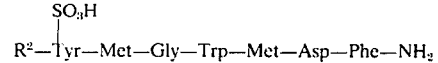
R$^2$—Tyr—Met—Gly—Trp—Met—Asp—Phe—NH$_2$ wherein all optically active amino acids are of the L-configuration and wherein R$^2$ is Ala, Abu, B-Asp, maleyl or fumaryl or succinyl, and pharmaceutically acceptable ammonium, alkali metal or alkaline earth metal salts thereof.

5. A compound according to claim 1 having the formula:

Asp—Tyr—R$^3$—Gly—Trp—R$^4$—Asp—Phe—NH$_2$ wherein all optically active amino acids are of the L-configuration and wherein R$^3$ and R$^4$ are Leu, Nle, Abu, or Met, provided only one of R$^3$ and R$^4$ is Met, and pharmaceutically acceptable ammonium, alkali metal or alkaline earth metal salts thereof.

6. A compound according to claim 1 having the formula

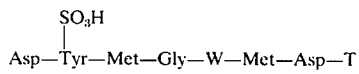
Asp—Tyr—Met—Gly—W—Met—Asp—T wherein W and T are as defined in claim 1, wherein the Asp, Tyr and Met moieties are of the L-configuration, and pharmaceutically acceptable ammonium, alkali metal or alkaline earth metal salts thereof.

7. A compound of claim 1 having the formula

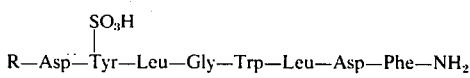
R—Asp—Tyr—Leu—Gly—Trp—Leu—Asp—Phe—NH$_2$ wherein R is H or t-butyloxycarbonyl.

8. A compound of claim 2 wherein R is t-butyloxycarbonyl.

9. A compound of claim 3 wherein R′ is Ala.

10. A compound of claim 3 wherein R′ is Glu.

* * * * *

UNITED STATES PATENT OFFICE
CERTIFICATE OF CORRECTION

PATENT NO. : 3,892,726  Page 1 of 4
DATED : July 1, 1975
INVENTOR(S) : Miguel Angel Ondetti et al.

It is certified that error appears in the above-identified patent and that said Letters Patent are hereby corrected as shown below:

Abstract page, second formula in column 2 should read $\overset{SO_3H}{\underset{|}{Tyr}}$.
Column 2, line 12, "αaminobutyryl" should read --α-aminobutyryl--
Column 2, line 51, "of" should read --or--.
Column 8, line 6, "hydroazide" should read --hydrazide--.
Column 11, the compound of Example 22 should read $$\text{--L-Asp-L-}\overset{SO_3H}{\underset{|}{Tyr}}\text{-L-Met-Gly-L-Trp-L-Met-L-Asp-D-Phe-NH}_2\text{--}.$$

Column 12, the compound of Example 23 should read $$\text{--L-Asp-L-}\overset{SO_3H}{\underset{|}{Tyr}}\text{-L-Met-Gly-D-Trp-L-Met-L-Asp-D-Phe-NH}_2\text{--}.$$

Column 12, the compound of Example 24 should read $$\text{--L-Asp-L-}\overset{SO_3H}{\underset{|}{Tyr}}\text{-L-Leu-Gly-L-Trp-L-Leu-L-Asp-L-Phe-NH}_2\text{--}.$$

Column 12, the compound of Example 25 should read $$\text{--L-Asp-L-}\overset{SO_3H}{\underset{|}{Tyr}}\text{-L-Leu-Gly-L-Trp-L-Nle-L-Asp-L-Phe-NH}_2\text{--}.$$

Column 12, the compound of Example 26 should read $$\text{--L-Asp-L-}\overset{SO_3H}{\underset{|}{Tyr}}\text{-L-Leu-Gly-L-Trp-L-Abu-L-Asp-L-Phe-NH}_2\text{--}.$$

Column 13, the compound of Example 27 should read $$\text{--L-Asp-L-}\overset{SO_3H}{\underset{|}{Tyr}}\text{-L-Leu-Gly-L-Trp-L-Met-L-Asp-L-Phe-NH}_2\text{--}.$$

Column 13, the compound of Example 28 should read $$\text{--L-Asp-L-}\overset{SO_3H}{\underset{|}{Tyr}}\text{-L-Nle-Gly-L-Trp-L-Leu-L-Asp-L-Phe-NH}_2\text{--}.$$

UNITED STATES PATENT OFFICE
CERTIFICATE OF CORRECTION

PATENT NO. : 3,892,726
DATED : July 1, 1975
INVENTOR(S) : Miguel Angel Ondetti et al.

It is certified that error appears in the above-identified patent and that said Letters Patent are hereby corrected as shown below:

Column 13, the compound of Example 29 should read $$\text{--L-Asp-L-Tyr(SO}_3\text{H)-L-Nle-Gly-L-Trp-L-Abu-L-Asp-L-Phe-NH}_2\text{--}.$$

Column 13, the compound of Example 30 should read $$\text{--L-Asp-L-Tyr(SO}_3\text{H)-L-Nle-Gly-L-Trp-L-Met-L-Asp-L-Phe-NH}_2\text{--}.$$

Column 13, the compound of Example 31 should read $$\text{--L-Asp-L-Tyr(SO}_3\text{H)-L-Nle-Gly-L-Trp-L-Nle-L-Asp-L-Phe-NH}_2\text{--}.$$

Column 13, the compound of Example 32 should read $$\text{--L-Asp-L-Tyr(SO}_3\text{H)-L-Abu-Gly-L-Trp-L-Abu-L-Asp-L-Phe-NH}_2\text{--}.$$

Column 14, the compound of Example 33 should read $$\text{--L-Asp-L-Tyr(SO}_3\text{H)-L-Abu-Gly-L-Trp-L-Leu-L-Asp-L-Phe-NH}_2\text{--}.$$

Column 14, the compound of Example 34 should read $$\text{--L-Asp-L-Tyr(SO}_3\text{H)-L-Abu-Gly-L-Trp-L-Nle-L-Asp-L-Phe-NH}_2\text{--}.$$

Column 14, the compound of Example 35 should read $$\text{--L-Asp-L-Tyr(SO}_3\text{H)-L-Abu-Gly-L-Trp-L-Met-L-Asp-L-Phe-NH}_2\text{--}.$$

Column 14, the compound of Example 36 should read $$\text{--L-Asp-L-Tyr(SO}_3\text{H)-L-Met-Gly-L-Trp-L-Leu-L-Asp-L-Phe-NH}_2\text{--}.$$

UNITED STATES PATENT OFFICE
CERTIFICATE OF CORRECTION

PATENT NO. : 3,892,726

DATED : July 1, 1975

INVENTOR(S) : Miguel Angel Ondetti et al.

It is certified that error appears in the above-identified patent and that said Letters Patent are hereby corrected as shown below:

Column 14, the compound of Example 36 should read $$\overset{\text{SO}_3\text{H}}{\underset{|}{}}$$
--L-Asp-L-Tyr-L-Met-Gly-L-Trp-L-Leu-L-Asp-L-Phe-NH$_2$--.

Column 14, the compound of Example 37 should read $$\overset{\text{SO}_3\text{H}}{\underset{|}{}}$$
--L-Asp-L-Tyr-L-Met-Gly-L-Trp-L-Leu-L-Asp-L-Phe-NH$_2$--.

Column 15, the compound of Example 38 should read $$\overset{\text{SO}_3\text{H}}{\underset{|}{}}$$
--L-Asp-L-Tyr-L-Met-Gly-L-Trp-L-Abu-L-Asp-L-Phe-NH$_2$--.

Column 15, the compound of Example 39 should read $$\overset{\text{SO}_3\text{H}}{\underset{|}{}}$$
--L-Ala-L-Tyr-L-Met-Gly-L-Trp-L-Met-L-Asp-L-Phe-NH$_2$--.

Column 15, the compound of Example 40 should read $$\overset{\text{SO}_3\text{H}}{\underset{|}{}}$$
--L-Abu-L-Tyr-L-Met-Gly-L-Trp-L-Met-L-Asp-L-Phe-NH$_2$--.

Column 15, the compound of Example 42 should read $$\overset{\text{SO}_3\text{H}}{\underset{|}{}}$$
--L-Ala-L-Tyr-Met-Gly-L-Trp-L-Met-L-Glu-L-Phe-NH$_2$--.

Column 16, the compound of Example 43 should read $$\overset{\text{SO}_3\text{H}}{\underset{|}{}}$$
--Hexanoyl-L-Asp-L-Tyr-L-Leu-Gly-L-Trp-L-Met-L-Asp-L-Phe-NH$_2$--.

UNITED STATES PATENT OFFICE
CERTIFICATE OF CORRECTION

PATENT NO. : 3,892,726  Page 4 of 4
DATED : July 1, 1975
INVENTOR(S) : Miguel Angel Ondetti et al It is certified that error appears in the above-identified patent and that said Letters Patent are hereby corrected as shown below:

Column 16, the compound of Example 44 should read $$\text{--Succinyl-L-Asp-L-}\overset{\overset{\displaystyle SO_3H}{|}}{\text{Tyr}}\text{-L-Leu-Gly-L-Trp-L-Met-L-Asp-L-Phe-NH}_2\text{--}.$$

Column 16, the compound of Example 45 C. should read $$\text{--}\beta\text{-L-Asp-L-}\overset{\overset{\displaystyle SO_3H}{|}}{\text{Tyr}}\text{-L-Met-Gly-L-Trp-L-Met-L-Asp-L-Phe-NH}_2\text{--}.$$

Column 16, line 39, "αOBzl" should read --α-OBzl--.

Signed and Sealed this sixth Day of January 1976

[SEAL]

Attest:

RUTH C. MASON
*Attesting Officer*

C. MARSHALL DANN
*Commissioner of Patents and Trademarks*